United States Patent
Meckes et al.

(10) Patent No.: US 11,427,333 B2
(45) Date of Patent: Aug. 30, 2022

(54) PASSENGER SERVICE UNIT WITH COVER

(71) Applicant: Zodiac Cabin Controls GmbH, Hamburg (DE)

(72) Inventors: Ruediger Meckes, Berkenthin (DE); Marco Hollm, Oelixdorf (DE); Andreas Westphal, Eutin (DE); Etienne Tomasena, Lübeck (DE)

(73) Assignee: ZODIAC CABIN CONTROLS GMBH, Hamburg (DE)

( * ) Notice: Subject to any disclaimer, the term of this patent is extended or adjusted under 35 U.S.C. 154(b) by 333 days.

(21) Appl. No.: 16/793,827

(22) Filed: Feb. 18, 2020

(65) Prior Publication Data

US 2020/0262567 A1    Aug. 20, 2020

Related U.S. Application Data

(60) Provisional application No. 62/807,862, filed on Feb. 20, 2019.

(51) Int. Cl.
*B64D 13/06* (2006.01)
*A62B 7/14* (2006.01)
(Continued)

(52) U.S. Cl.
CPC ............... *B64D 13/06* (2013.01); *A62B 7/14* (2013.01); *A62B 25/005* (2013.01); *B64D 11/00* (2013.01);
(Continued)

(58) Field of Classification Search
CPC ................... B64D 13/06; B64D 11/00; B64D 2011/0046; B64D 2011/0053;
(Continued)

(56) References Cited

U.S. PATENT DOCUMENTS 4,909,247 A * 3/1990 Terrisse ............... A62B 25/005
128/205.25
6,318,364 B1 * 11/2001 Ford ..................... B64D 10/00
128/204.29
(Continued)

FOREIGN PATENT DOCUMENTS

CA    2852823 A1 *  5/2013  ............ A62B 18/02
EP    2803573       11/2014
(Continued)

OTHER PUBLICATIONS

European Search Report and Written Opinion issued in EP 20 15 8269.
Search Report issued in European Application 20158269.9 dated Aug. 3, 2020.

*Primary Examiner* — Valentina Xavier
(74) *Attorney, Agent, or Firm* — Jeffer Mangels; Butler & Mitchell LLP; Brennan C. Swain, Esq.

(57) ABSTRACT

A passenger service unit assembly that includes a frame that defines at least an oxygen opening and a service opening, an oxygen mask housing positioned adjacent the oxygen opening, an oxygen mask housing cover positioned to cover the oxygen opening, and a service cover positioned to cover the service opening. An oxygen mask that is movable between a stowed position and a deployed position is positioned in the oxygen mask housing. The oxygen mask housing cover maintains the oxygen mask in the stowed position. The oxygen mask housing cover is movable between a closed position and an open position. When the oxygen mask housing cover is moved to the deployed position, the oxygen mask drops to the deployed position via gravity. The service cover is movable between a closed position and an open position and includes at least a first passenger service unit component associated therewith.

7 Claims, 4 Drawing Sheets

(51) Int. Cl.
    *A62B 25/00* (2006.01)
    *B64D 11/00* (2006.01)
    *B64D 13/00* (2006.01)

(52) U.S. Cl.
    CPC ............... *B64D 2011/0046* (2013.01); *B64D 2011/0053* (2013.01); *B64D 2013/003* (2013.01); *B64D 2013/0625* (2013.01); *B64D 2013/0677* (2013.01); *B64D 2231/025* (2013.01)

(58) Field of Classification Search
    CPC ...... B64D 2013/003; B64D 2013/0625; B64D 2013/0677; B64D 2231/025; B64D 11/0015; A62B 7/14; A62B 25/005
    See application file for complete search history.

(56) References Cited

U.S. PATENT DOCUMENTS

| | | |
|---|---|---|
| 2007/0066132 A1 | 3/2007 | Rittner et al. |
| 2015/0090839 A1 | 4/2015 | Freund et al. |
| 2017/0203856 A1 | 7/2017 | Dunn et al. |

FOREIGN PATENT DOCUMENTS

| | | |
|---|---|---|
| EP | 2803573 A2 | 11/2014 |
| WO | 9743179 A1 | 11/1997 |
| WO | 1997043179 | 11/1997 |
| WO | 201612355 A1 | 8/2016 |
| WO | 2016123551 | 8/2016 |

\* cited by examiner

PASSENGER SERVICE UNIT WITH COVER

CROSS REFERENCE TO RELATED APPLICATIONS

This application claims the benefit of U.S. Provisional Application No. 62/807,862, filed Feb. 20, 2019, the entirety of which is incorporated herein by reference.

FIELD OF THE INVENTION

The present invention relates generally to a passenger service unit, and more particularly to a passenger service unit that includes one or more additional service covers.

BACKGROUND OF THE INVENTION

The need has arisen to develop an aircraft passenger service unit (PSU) that allows for simpler maintenance, and easier repair and assembly, while helping reduce the effort needed to check and repack passenger oxygen masks. Typical PSU's are compact and multifunctional units which provide services to the aircraft passengers such as reading light, gasper air, cabin attendant call and indication, loudspeaker, information signs, in-flight entertainment and supplemental oxygen. Oxygen masks are often stored within a compartment of the PSU, which is covered by a removable lid. This lid is automatically released in case of aircraft decompression. The remaining services, for example the loudspeaker are installed in a surface structure, which is rigidly connected to the PSU frame. Due to the nature of the current design, PSU's, including gap seals, have to be detached from the passenger service channel for maintenance purposes. This leads to a high amount of maintenance work. Further, in case of failure of components not belonging to the oxygen portion, the PSU oxygen system has to be disconnected from the aircraft oxygen system in order to repair or replace the other components. Such an action requires a complete retesting of the oxygen system after PSU maintenance or repair. Checking and repacking of the oxygen masks requires a large expenditure of time and effort due to the segregated design of the oxygen compartment within the PSU. This known technology is difficult to maintain, repair and assemble.

SUMMARY OF THE PREFERRED EMBODIMENTS

In accordance with a first aspect of the present invention there is provided a passenger service unit assembly that includes a frame that defines at least an oxygen opening and a service opening, an oxygen mask housing positioned adjacent the oxygen opening, an oxygen mask housing cover positioned to cover the oxygen opening, and a service cover positioned to cover the service opening. An oxygen mask that is movable between a stowed position and a deployed position is positioned in the oxygen mask housing. The oxygen mask housing cover maintains the oxygen mask in the stowed position. The oxygen mask housing cover is movable between a closed position and an open position. When the oxygen mask housing cover is moved to the deployed position, the oxygen mask drops to the deployed position via gravity. The service cover is movable between a closed position and an open position and includes at least a first passenger service unit component associated therewith. In a preferred embodiment, when the service cover is in the open position, a line of sight path is defined through the service opening and to the oxygen mask housing. The oxygen mask housing is preferably transparent such that a person looking along the line of sight path can see the oxygen mask inside the oxygen mask housing when the oxygen mask housing cover is in the closed position.

In a preferred embodiment, the passenger service unit assembly further includes a stop member that can be positioned between the oxygen mask and the oxygen mask housing cover, such that when the oxygen mask housing cover is moved to the open position, the stop member maintains the oxygen mask in the stowed position.

In accordance with another aspect of the present invention there is provided a method of servicing a passenger service unit assembly that is positioned in an aircraft cabin. It will be appreciated that the passenger service unit assembly is not serviceable from above, but is only serviceable from below (i.e., under the bottom surface of the frame, service cover, oxygen mask cover, etc.). The method includes moving the service cover (which has a first passenger service unit component associated therewith or extending therethrough) from a closed position to an open position, servicing the first passenger service unit component, and moving the service cover from the open position to the closed position. The oxygen mask is movable between a stowed position and a deployed position. However, during these step above, the oxygen mask remains in the stowed position.

In a preferred embodiment, the oxygen mask housing is transparent. In this embodiment, the method includes looking through the service opening and the transparent oxygen mask housing and checking the status of the oxygen mask in the stowed position. In a preferred embodiment, the method includes obtaining a stop member, inserting the stop member through the service opening, positioning the stop member between the oxygen mask and the oxygen mask housing cover, and moving the oxygen cover from the closed position to the open position. The oxygen mask is maintained in the stowed position by the stop member.

In a preferred embodiment, the present invention includes a second lid adjacent to the oxygen mask lid in the PSU. Preferably, at least one passenger service function is integrated into the second lid. Furthermore, if the second lid is in near proximity to the oxygen mask compartment, the opening for the second lid can be used to inspect the correct mask packaging via a transparent mask housing. The mask housing being the structure which holds and surrounds the oxygen masks. In a preferred embodiment, the mask housing comprises a transparent material to allow see through inspection. This makes inspection possible when the second lid is open despite the oxygen mask lid remaining closed.

In a preferred embodiment, a PSU with improved maintainability is used in the aircraft passenger cabin for each seat row. However, this is not a limitation and the PSU with improved maintainability can be used for more than on row or can also be used in aircraft lavatories, crew rest areas, galleys or in or for individual passenger seats. Compared to the prior art, the PSU with improved maintainability design allows for simpler maintenance, easier repair and assembly, and reduces the effort needed to check and repack passenger oxygen masks by introducing one or more additional service lids. The addition of at least one lid (compared to the prior art), which will be incorporated into the PSU. This additional lid carries at least one passenger service function and allows for easy access to the passenger service functions integrated into the second lid. The additional lid with the integrated service functions improves maintenance and assembly of the passenger service unit and the related passenger service functions. The additional lid can also enable checking of the packed oxygen masks within a transparent oxygen compartment, without opening the oxygen compartment lid. This eliminates the oxygen lid release test. In a preferred embodiment, the emergency oxygen lid has no passenger service functions incorporated into it, thus such lid can be designed with low weight and small dimensions, which improves safety during a decompression and emergency evacuation scenario.

In a second embodiment, a specific mask support structure or retaining strip can be fitted through the open second lid inside the oxygen mask compartment during oxygen mask installation. This support structure, or retaining strip, holds the oxygen masks in place when the PSU oxygen mask lid is opened. This is advantageous because it allows the masks and their associated oxygen tubes to be inspected without having the masks fall, or deploy, due to gravity. If the masks fall or deploy due to gravity while the oxygen mask lid is open for maintenance or inspection, they need to be repacked. Repacking takes time and typically requires two people to perform. Inspecting the masks while they are held in place by the support structure or retaining strip greatly reduces maintenance time and number of people needed to inspect and repack the masks.

In a preferred embodiment, the PSU includes a frame, which forms the structural part of the PSU. The oxygen mask housing includes at least one oxygen mask, which will be supplied with oxygen by the oxygen hose. The oxygen mask compartment is covered by a removable lid. Such lid is fixed by a hinge on one side and by a latch on the other side. In a preferred embodiment, the latch is an electrically actuated latch that receives the electrical actuation signal via a control line. The oxygen is delivered by the oxygen source. The service functions, for example, one or more reading lights, reading light cable, reading light switch, reading light switch cable, passenger air, and an electronic control unit, are positioned on the service lid. Such service lid is removable and fixed on one side by a hinge or a suitable mounting means and on the other side by a locking mechanism. The loudspeaker is mounted to the PSU structure, which includes air gaps for sound transmission, which is supplied by a cable. The signs for passenger information, the cabin attendant call and indication and the electrical cable are located on the left side of the PSU structure (or can also be located on the right). The opening angle of the service lid is large enough to enable good access to the service functions.

The present invention can be used in different types of aircraft including, but not limited to, commercial, business and/or military. The present invention can be further used in scenarios other than an aircraft. For example the invention can be used in other modes of transportation including but not limited to trains, cars, buses and vertical take-off and landing autonomous vehicles.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
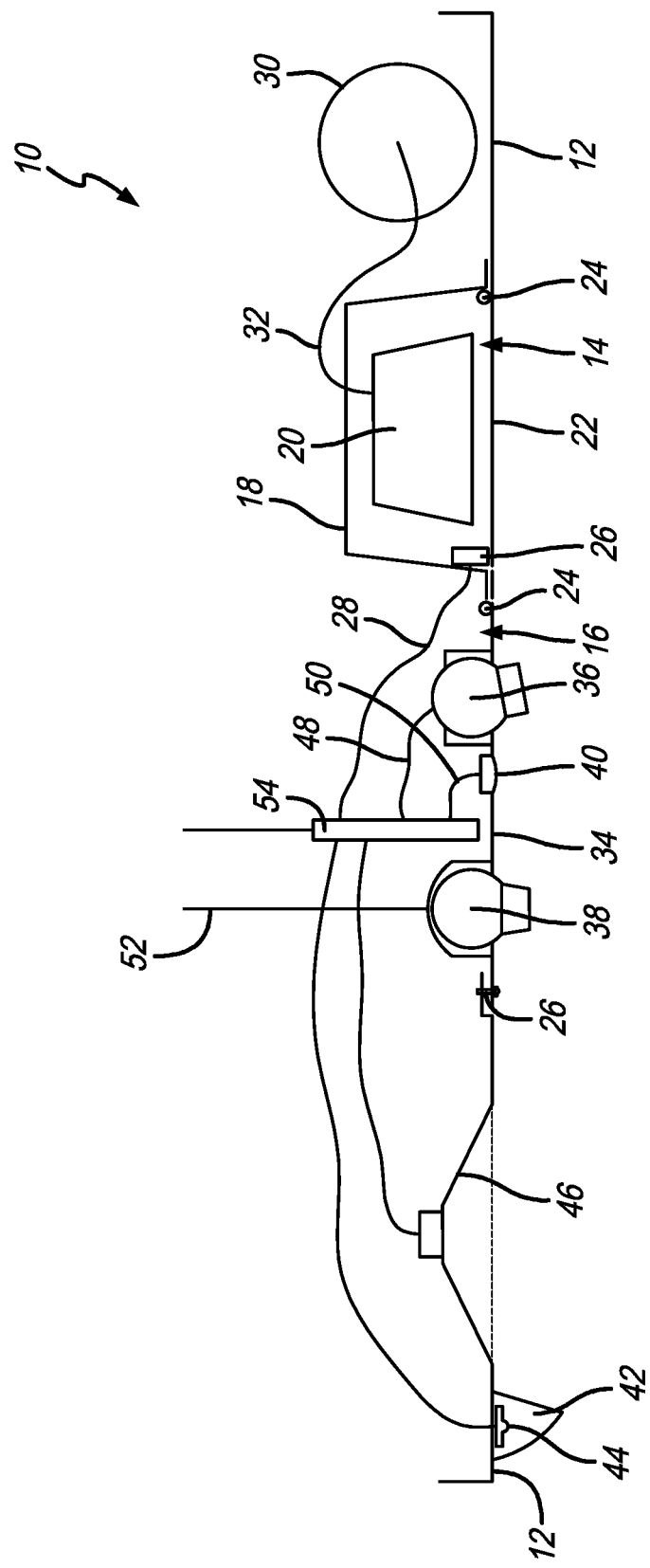
FIG. 1 is a schematic side view of a passenger service unit assembly in accordance with a preferred embodiment of the invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Referring now to the drawings, which are for purposes of illustrating the present invention and not for purposes of limiting the same, the drawings show a passenger service unit assembly (PSU assembly) 10 that is configured to be installed or used in a commercial passenger aircraft.

As shown in FIG. 1, in a preferred embodiment, the PSU assembly 10 generally includes frame 12 that defines at least an oxygen opening 14 and a service opening 16, an oxygen mask housing 18 positioned adjacent to or above the oxygen opening 14, and an oxygen mask 20 positioned in the oxygen mask housing 18. The oxygen mask 20 is movable between a stowed position (as shown in FIG. 1) and a deployed position where it has dropped out of the oxygen mask housing 18, through the oxygen opening 14 and is accessible by a passenger. An oxygen mask housing cover 22 is positioned to cover the oxygen opening 14 and maintains the oxygen mask 20 in the stowed position.

The oxygen mask housing cover 22 can be secured in place by any latching method. In a preferred embodiment, the oxygen mask housing cover 22 is pivotably connected (e.g., to the frame 12 or other component) on one side by a hinge 24 and on the other side by a latch 26. The latch 26 can be an electrically actuated latch that receives the electrical actuation signal via a control line 28. The oxygen is delivered to the oxygen mask 20 by an oxygen source 30 via an oxygen hose 32.

A service cover 34 is positioned to cover the service opening 16. The service cover 34 is movable between a closed position and an open position and includes at least a first passenger service unit component associated therewith. Exemplary passenger service unit components are shown in FIG. 1. For example, the passenger service unit component(s) can be a reading light 36, air gasper 38, light switch 40, passenger info sign 42 (e.g., no smoking, flight attendant call light), attendant call button 44, a speaker 46 or the like. Each of the passenger service unit passenger functions may also include a cord, wire or other component for providing electricity, air or data signals thereto. For example, see reading light cable 48, reading light switch cable 50, air supply conduit 52, and the electronic control unit 54 to which a number of cables and cords described herein are attached/communicated.

In a preferred embodiment, the speaker 46 is mounted to the frame 12 and includes a grille 56 for sound transmission, which is supplied by a cable 58. The signs for passenger information 42 the cabin attendant call and indication 44 and the electrical cable 60 for the attendant call and indication 44 are located adjacent the service cover 34. However, in another embodiment, they can all be located on the service cover 34. In another embodiment, another cover member can be provided for access to these functions. The service cover 34 can be secured in place by any latching method. In a preferred embodiment, the service cover 34 is pivotably connected (e.g., to the frame 12 or other component) on one side by a hinge 24 and on the other side by a latch 26. The latch 26 can be an electrically actuated latch that receives the electrical actuation signal via a control line 28. When pivotably or hingedly connected, the opening angle of the service cover 34 is enough to allow access to a person servicing any of the passenger service unit components.

Figure 2:
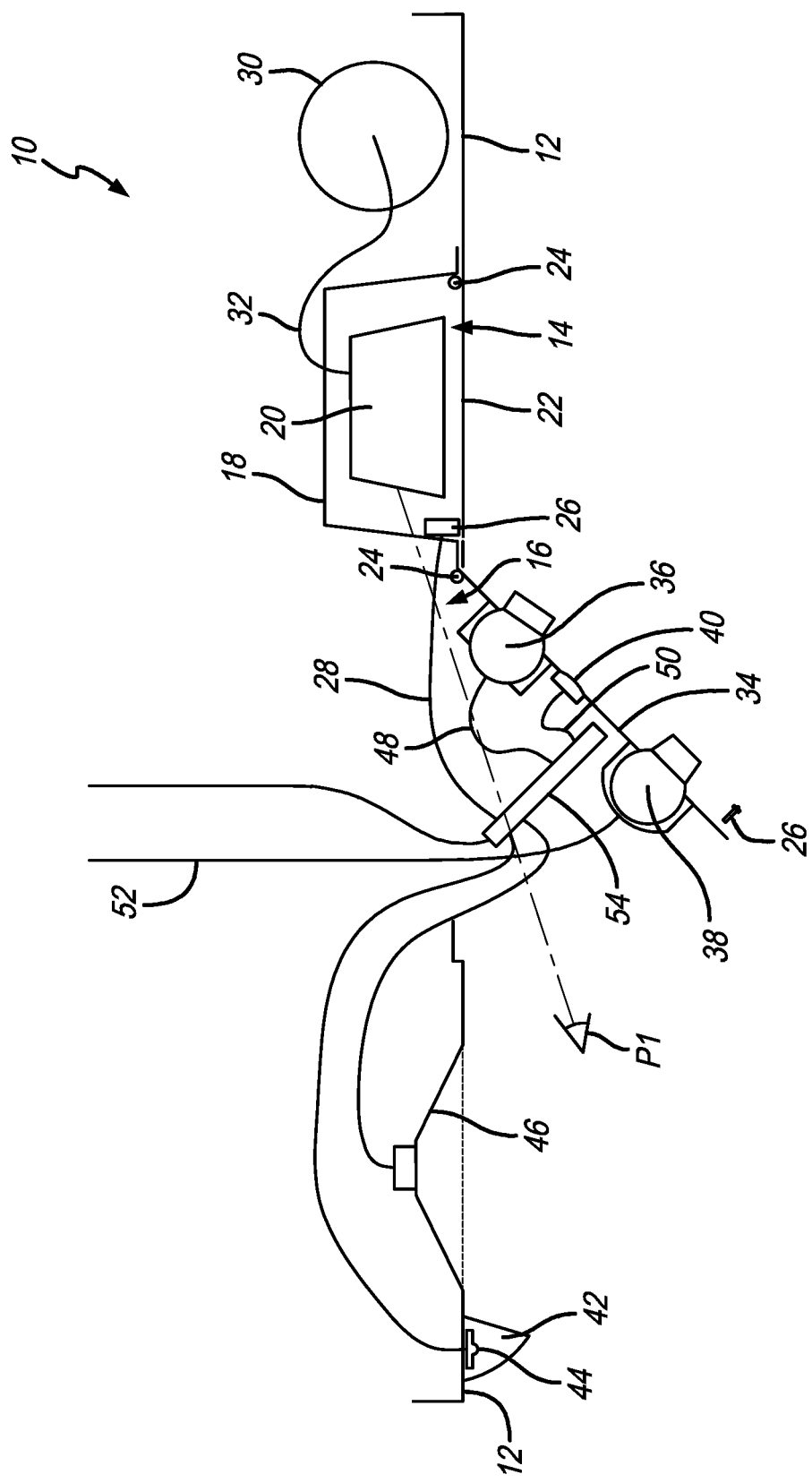
FIG. 2 is a schematic side view showing the service cover and associated components in the open position.

It will be appreciated that the separate oxygen mask cover 22 and service cover 34 allow the passenger service unit components to be serviced separately from the oxygen mask 20 and related components. Therefore, in use, as shown in FIG. 2, the service cover 34 is moved from the closed position to the open position, the first passenger service unit component is serviced or attended to, and the service cover 34 is moved back to the open position without ever disturbing the oxygen mask 20 or associated components.

In a preferred embodiment, the oxygen mask housing 18 is made of a transparent material. This allows the oxygen mask 20 to be checked without having to open the oxygen mask cover 22. As shown in FIG. 2, in a preferred embodiment, when the service cover 34 is in the open position, a line of sight path P1 is defined through the service opening 16 and to the oxygen mask housing 18. As a result, a person looking along the line of sight path can see the oxygen mask 20 inside the oxygen mask housing 18 even when the oxygen mask housing cover 22 is still in the closed position.

Figure 3:
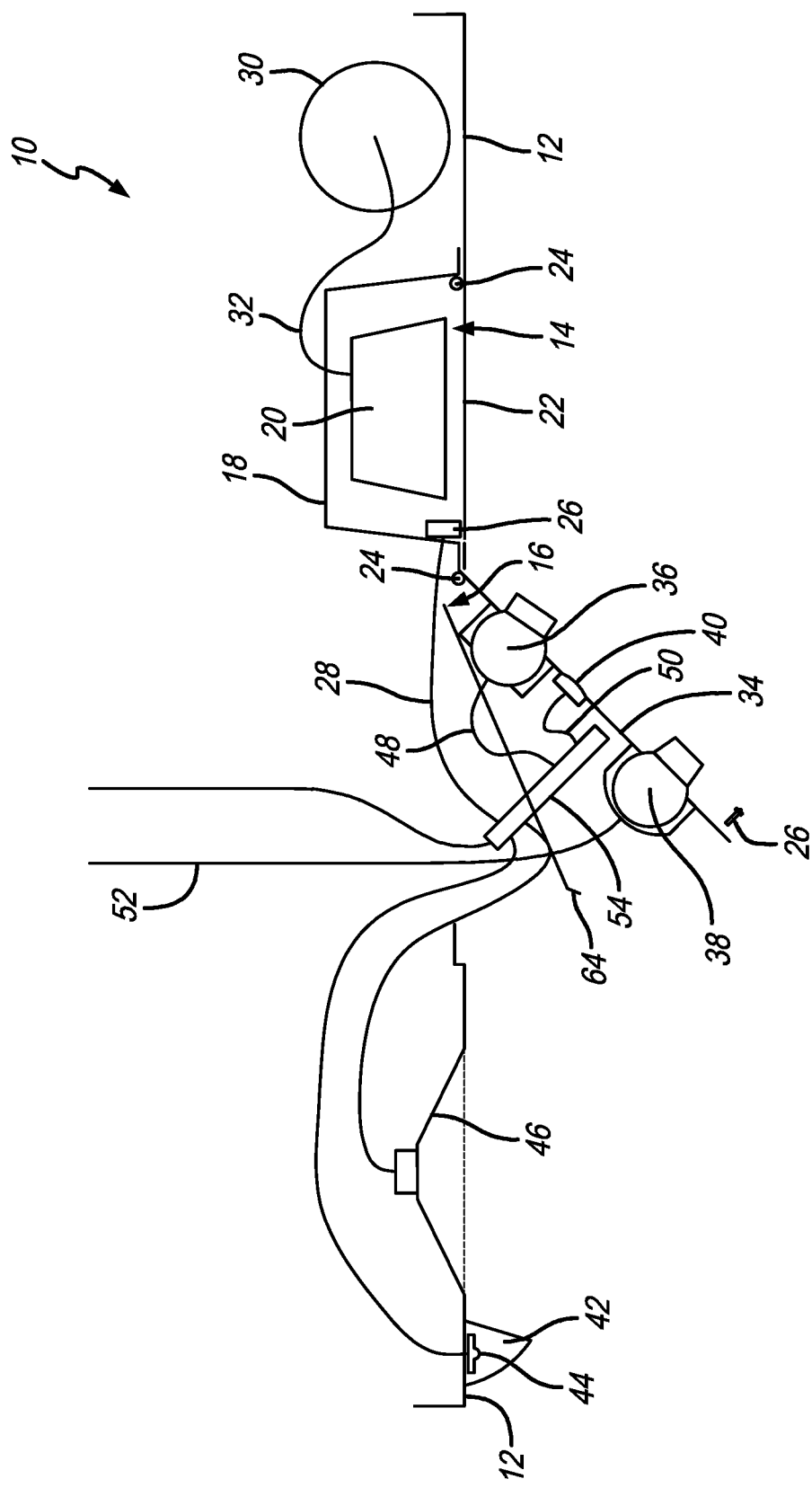
FIG. 3 is a schematic side view showing the service cover and associated components in the open position and with a stop member being inserted through the service opening.
Figure 4:
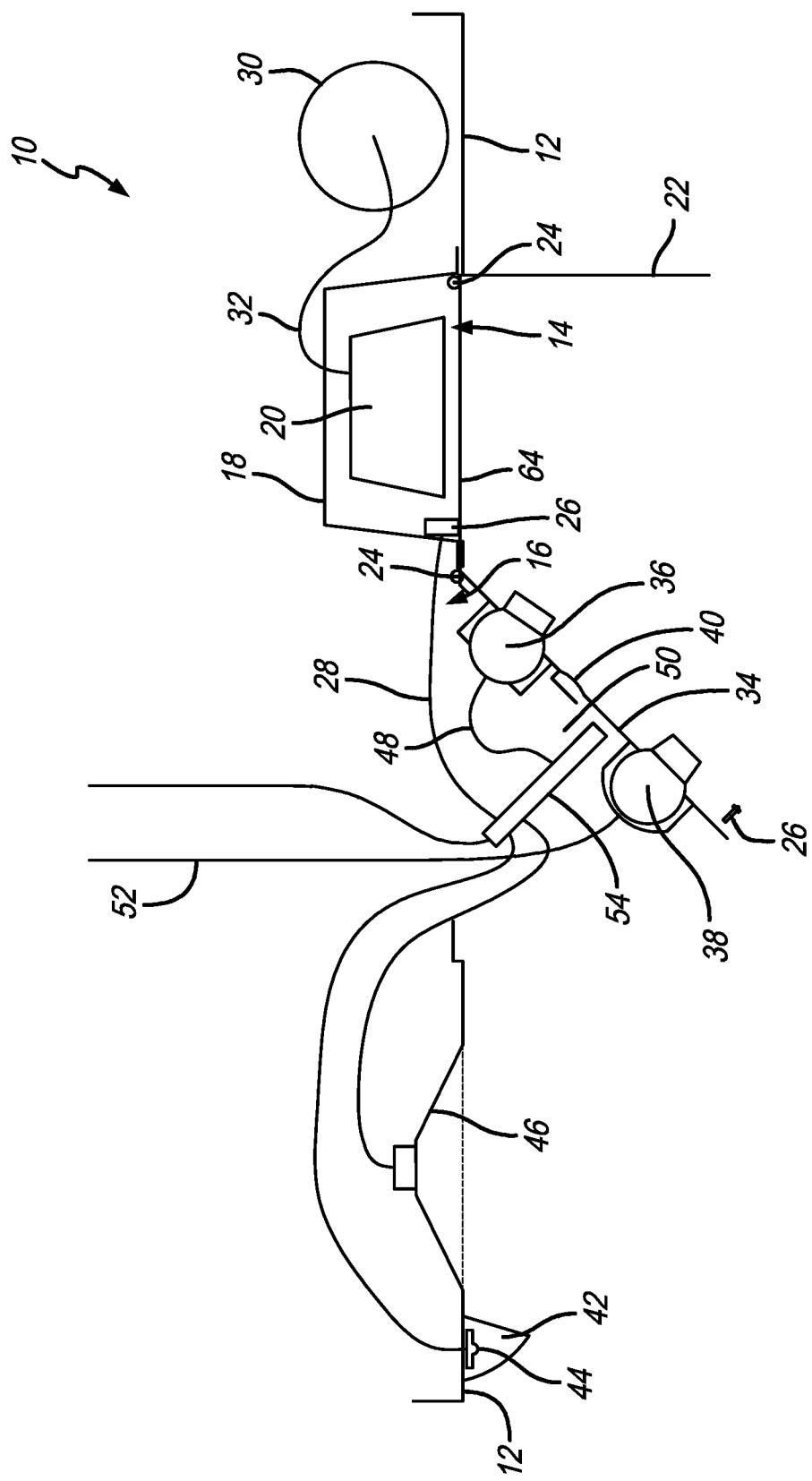
FIG. 4 is a schematic side view showing the service cover and associated components in the open position and with the stop member positioned between the oxygen mask and the oxygen mask housing cover.

As shown in FIGS. 3 and 4, in a preferred embodiment, a stop member 64 is included with the PSU assembly. In use, the stop member 64 is inserted through the service opening 16 (as shown in FIG. 3), and is positioned between the oxygen mask 20 and the oxygen mask housing cover 22. Therefore, if some service needs to be provided in the oxygen mask housing 18, but the user does not want the mask to fall out, when the oxygen mask housing cover 22 is opened, the stop member 64 prevents the oxygen mask 20 from falling out. The oxygen opening 14 has a first width dimension and the stop member 64 has a second width dimension. In a preferred embodiment, the second width dimension is greater than the first width dimension. This allows the stop member 64 to span the oxygen opening 14.

The stop member 64 can be a plate, strip or any component or element that can be inserted through the service opening 16 and between the oxygen mask housing cover 22 and the oxygen mask 20 to prevent the oxygen mask 20 from falling out of the oxygen mask housing 18 when the oxygen mask cover 22 is opened. Furthermore, the stop member 64 can be inserted through any opening, slot, crack or the like to be positioned adjacent the oxygen mask. For example, in FIG. 4, the stop member 64 is positioned below the oxygen mask housing 18 and above the oxygen mask housing cover 22. In another embodiment, a slot or opening can be defined in a side wall (or in opposing side walls) of the oxygen mask housing cover 22 for insertion of the stop member 64.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A method of servicing a passenger service unit assembly that is positioned in an aircraft cabin, wherein the passenger service unit assembly includes a frame that defines at least an oxygen opening covered by an oxygen mask housing cover and a service opening covered by a service cover, wherein the passenger service unit assembly includes an oxygen mask housing positioned adjacent the oxygen opening, and an oxygen mask positioned in the oxygen mask housing, the method comprising the steps of:

(a) moving the service cover from a closed position to an open position, wherein the service cover includes at least a first passenger service unit component associated therewith,
   (b) servicing the first passenger service unit component,
   (c) obtaining a stop member,
   (d) inserting the stop member through the service opening,
   (e) positioning the stop member between the oxygen mask and the oxygen mask housing cover and spanning the oxygen opening,
   (f) moving the oxygen mask housing cover from the closed position to the open position, wherein the oxygen mask is maintained in the stowed position by the stop member, and
   (g) moving the service cover from the open position to the closed position.

2. The method of claim 1 wherein the oxygen mask is movable between a stowed position and a deployed position, and wherein during steps (a) to (g) above, the oxygen mask remains in the stowed position.

3. The method of claim 2 wherein the oxygen mask housing is transparent, wherein the method further comprises the step of looking through the service opening and the transparent oxygen mask housing and checking the status of the oxygen mask in the stowed position.

4. A passenger service unit assembly comprising:
   a frame that defines at least an oxygen opening and a service opening that are separated by a separation member,
   an oxygen mask housing positioned adjacent the oxygen opening, and an oxygen mask positioned in the oxygen mask housing, wherein the oxygen mask is movable between a stowed position and a deployed position,
   an oxygen mask housing cover positioned to cover the oxygen opening and maintain the oxygen mask in the stowed position, wherein the oxygen mask housing cover is movable between a closed position and an open position, wherein when the oxygen mask housing cover is moved to the deployed position, the oxygen mask drops to the deployed position via gravity,
   a service cover positioned to cover the service opening, wherein the service cover is movable between a closed position and an open position, wherein the service cover includes at least a first passenger service unit component associated therewith,
   a stop member, wherein the stop member is positioned between the oxygen mask and the oxygen mask housing cover, wherein when the oxygen mask housing cover is moved to the open position, the stop member maintains the oxygen mask in the stowed position, wherein the stop member is insertable through the service opening and between the oxygen mask and the oxygen mask housing cover when the oxygen mask housing cover is in the closed position.

5. The passenger service unit assembly of claim 4 wherein when the service cover is in the open position, a line of sight path is defined through the service opening and to the oxygen mask housing, wherein the oxygen mask housing is transparent such that a person looking along the line of sight path can see the oxygen mask inside the oxygen mask housing when the oxygen mask housing cover is in the closed position.

6. The passenger service unit assembly of claim 4 wherein the first passenger service component is at least one of a reading light, an air gasper or a light switch.

7. The method of claim 1 wherein the service opening and oxygen opening are separated by a separation member, and wherein step (d) comprises inserting the stop member through the service opening and above the separation member.

* * * * *